United States Patent [19]
Nakaya et al.

[11] Patent Number: 6,078,352
[45] Date of Patent: Jun. 20, 2000

[54] STEREOSCOPIC VIEWING DEVICE AND STEREOSCOPIC VIEWING METHOD

[75] Inventors: Hideo Nakaya; Tetsujiro Kondo, both of Kanagawa, Japan

[73] Assignee: Sony Corporation, Tokyo, Japan

[21] Appl. No.: 08/829,728

[22] Filed: Mar. 31, 1997

[30] Foreign Application Priority Data

Apr. 5, 1996 [JP] Japan .................................. 8-110314

[51] Int. Cl.⁷ .................................................. H04N 7/18
[52] U.S. Cl. ................................ 348/42; 348/43; 348/44
[58] Field of Search ................................. 348/42, 43, 44, 348/578; 345/8

[56] References Cited

U.S. PATENT DOCUMENTS

| | | | |
|---|---|---|---|
| 5,619,256 | 4/1997 | Haskell et al. | 348/43 |
| 5,777,666 | 7/1998 | Tanase et al. | 348/43 |
| 5,790,184 | 8/1998 | Sato et al. | 348/53 |
| 5,808,664 | 9/1998 | Yamashita et al. | 348/42 |

*Primary Examiner*—Andy Rao
*Attorney, Agent, or Firm*—Frommer Lawrence & Haug, LLP.; William S. Frommer

[57] ABSTRACT

This invention concerns a stereoscopic viewing device and a stereoscopic viewing method, and makes it possible to provide a satisfactory stereoscopic image without increasing of the quantity of recorded information and the quantity of transmitted information. According to the invention, the input television signal is classified respectively on the basis of the level distribution pattern for every pixel in the spatio-temporal region whose center is lying on each attentional pixel, and the input television signal is blocked for every pixel in the spatio-temporal region whose center is lying on each attentional pixel respectively so as to generate the pixel data for predictive calculation, and the predictive calculation of the predictive calculating pixel data is processed utilizing the predictive coefficient which is corresponding to the result of classification obtained from the classifying means out of the predictive coefficients of each set which have been previously prepared, so as to generate the video signal for left eye and the image signal for right eye respectively, and then the stereoscopic image is displayed on the basis of the video signal for left eye and the video signal for right eye; in this way a stereoscopic image can be projected on the displaying means such that a flicker is eliminated and a deterioration of the image quality is prevented.

16 Claims, 7 Drawing Sheets

STEREOSCOPIC VIEWING DEVICE AND STEREOSCOPIC VIEWING METHOD

BACKGROUND OF THE INVENTION

1. Field of the Invention

This invention relates to a stereoscopic viewing device and a stereoscopic viewing method, and more particularly, is applicable to a stereoscopic viewing device for displaying a stereoscopic image based on the input television signal.

2. Description of the Related Art

Heretofore, various stereoscopic viewing devices have been proposed, as published in, for instance, The Report of The Television Institute Vol. 45, No. 4, pp. 446–452 (1991).

In these stereoscopic viewing devices, there are those in which two images having parallax, which are corresponding to the left eye and the right eye, are displayed on a television monitor in such a manner that they are alternately switched for each field, while the displayed image is observed through a liquid crystal shutter glasses of which left-eye shutter and right-eye shutter are opened and closed in a synchronized manner with switching of the displayed image, and hereby stereoscopic viewing is realized.

By the way, in the method for realizing the stereoscopic viewing by alternately displaying two images which are corresponding to the left eye and the right eye on the television monitor, usually, it is required to record or transmit the images which have been previously taken by two television cameras which are corresponding to the left eye and the right eye. Therefore, there has been such disadvantage that two times of quantity of information is required so as not to deteriorate the time resolution of the image, and if the quantity of the information is not increased, flicker occurs and the image quality is deteriorated because of deterioration of the time resolution.

SUMMARY OF THE INVENTION

In view of the foregoing, an object of this invention is to provide a stereoscopic viewing device and a stereoscopic viewing method by which a satisfactory stereoscopic image can be obtained without increasing of the quantity of recorded information or the quantity of transmitted information.

The foregoing object and other objects of the invention have been achieved by the provision of a stereoscopic viewing device which comprises: a classifying means for classifying the input video signal respectively, on the basis of the level distribution pattern of plural pixels in the stated spatio-temporal region; a predictive blocking means for generating the pixel data for predictive calculation, by blocking the input video signal for every plural pixels in the stated spatio-temporal region; a predictive processing means which is previously having the plural sets of predictive coefficients which are respectively corresponding to the plural classes, and which processes the predictive calculation of the predictive calculating pixel data obtained on the basis of the output of the predictive blocking means, using the predictive coefficient which is corresponding to the classification result obtained on the basis of the output of the classifying means, out of the predictive coefficients of each said set, and hereby generates the video signal for left eye and the image signal for right eye respectively; and a display means for displaying the stereoscopic image on the basis of the video signal for left eye and the video signal for right eye which are obtained on the basis of the output of the predictive processing means.

Besides, the present invention provides a stereoscopic viewing method which comprises: a first step of classifying the input video signal respectively, on the basis of the level distribution pattern of each said pixel, for every plural pixels in the stated spatio-temporal region; a second step of generating the pixel data for predictive calculation, by blocking the input video signal for every plural pixels in the stated spatio-temporal region; a third step of processing the predictive calculation of the predictive calculating pixel data obtained on the basis of the output of the predictive blocking means, utilizing the predictive coefficient which is corresponding to the classification result obtained on the basis of the output of the classifying means, out of the plural sets of predictive coefficients which are respectively corresponding to the plural classes which have been previously prepared, and hereby generating the video signal for left eye and the image signal for right eye respectively; and a fourth step of displaying the stereoscopic image on the basis of the video signal for left eye and the video signal for right eye.

Therefore, according to the present invention, a stereoscopic image can be projected on a displaying means such that a flicker is eliminated and a deterioration of the image quality is prevented, owing to installation of a classifying means for classifying the input video signal respectively, on the basis of the level distribution pattern of plural pixels in the stated spatio-temporal region; a predictive blocking means for generating the pixel data for predictive calculation, by blocking the input video signal for every plural pixels in the stated spatio-temporal region; a predictive processing means which is previously having the plural sets of predictive coefficients which are respectively corresponding to the plural classes, and which processes the predictive calculation of the predictive calculating pixel data obtained on the basis of the output of the predictive blocking means, using the predictive coefficient which is corresponding to the classification result obtained on the basis of the output of the classifying means, out of the predictive coefficients of each said set, and hereby generates the video signal for left eye and the image signal for right eye respectively; and a display means for displaying the stereoscopic image on the basis of the video signal for left eye and the video signal for right eye which are obtained on the basis of the output of the predictive processing means.

Besides, according to the present invention, it is able to eliminate a flicker and to prevent a deterioration of the image quality, owing to the fact that the input video signal is classified respectively, on the basis of the level distribution pattern of each said pixel, for every plural pixels in the stated spatio-temporal region; and the pixel data for predictive calculation is generated, by blocking the input video signal for every plural pixels in the stated spatio-temporal region; and then the predictive calculation of the predictive calculating pixel data obtained on the basis of the output of the predictive blocking means is processed, utilizing the predictive coefficient which is corresponding to the classification result obtained on the basis of the output of the classifying means, out of the plural sets of predictive coefficients which are respectively corresponding to the plural classes which have been previously prepared, thereby generating the video signal for left eye and the image signal for right eye respectively; and then the stereoscopic image is displayed on the basis of the video signal for left eye and the video signal for right eye.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) An Embodiment

Figure 1:
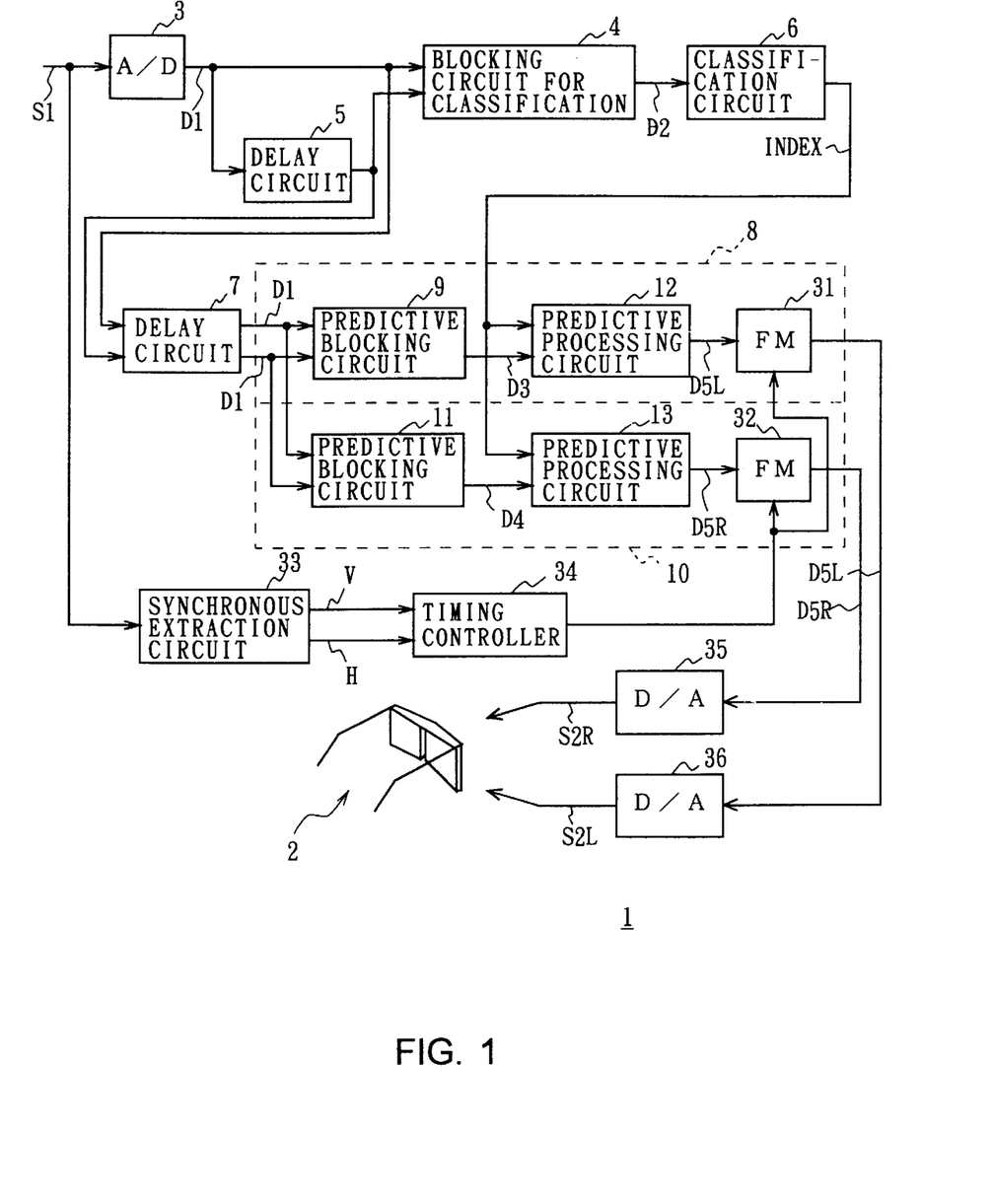
FIG. 1 is a block diagram illustrating a constitution of a stereoscopic viewing device according to an embodiment of the present invention.

In FIG. 1, numeral 1 generally shows a stereoscopic viewing device. A video signal for left eye (hereinafter, this is referred to as a left-eye video signal) S2L and a video signal for right eye (hereinafter, this is referred to as a right-eye video signal) S2R having a parallax therebetween are generated from single input television signal S1. The image which is based on each of these left-eye video signal S2L and right-eye video signal S2R is displayed on a display device 2.

In this case, the stereoscopic viewing device 1 converts the received input television signal S1 into the television data D1, with the sampling frequency of 13.5 [MHz], by means of an analog-to-digital conversion circuit (A/D) 3. The television data D1 is directly supplied to a blocking circuit for classification 4 and also supplied to the blocking circuit for classification 4 via a delay circuit 5. In this connection, the size of the image based on the television data D1 which is formed through sampling with the stated sampling frequency becomes about 720 pixels horizontal× 480 lines vertical per frame.

The blocking circuit for classification 4 forms blocks by the peripheral pixels in the space-time for each pixel clock, in order to find the classification code on the basis of the feature of the image content of the image portion in the micro-region around the stated pixel. As a result, the blocking circuit for classification 4 collects the blocked pixel data D2 which is comprised of the pixel data of the pixels which are present within the three-dimensional region whose center is lying on the pixel of the attentional point when they have been seen in the space-time (that is, the frame in which the attentional point is present and the neighborhood region covering the preceding and the succeeding frames) into a block, and then delivers it to a classifying circuit 6.

Figure 2A:
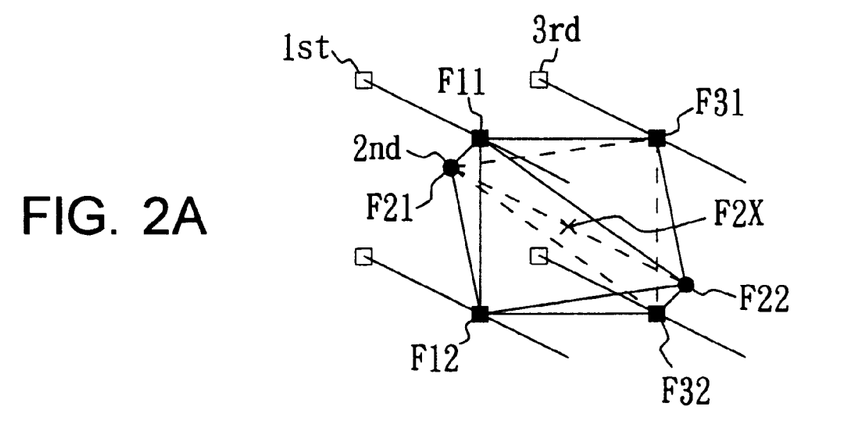
FIGS. 2A and 2B are schematic diagrams explaining the blocking for classification.

FIG. 2A shows an example of the block for classification. The blocking circuit for classification 4 selects the two points F11 and F12 which are lying on the slant upper part and the slant lower part of the first frame, the neighboring two points F21 and F22 on the scanning line of the second frame, and the two pixels F31 and F32 which are lying on the slant upper part and the slant lower part of the third frame, as the peripheral pixels, to predict the stated attentional point F2X at the second frame, and then outputs the pixel data of the respective pixels toward the classifying circuit 6 as the blocked pixel data D2.

Figure 2B:
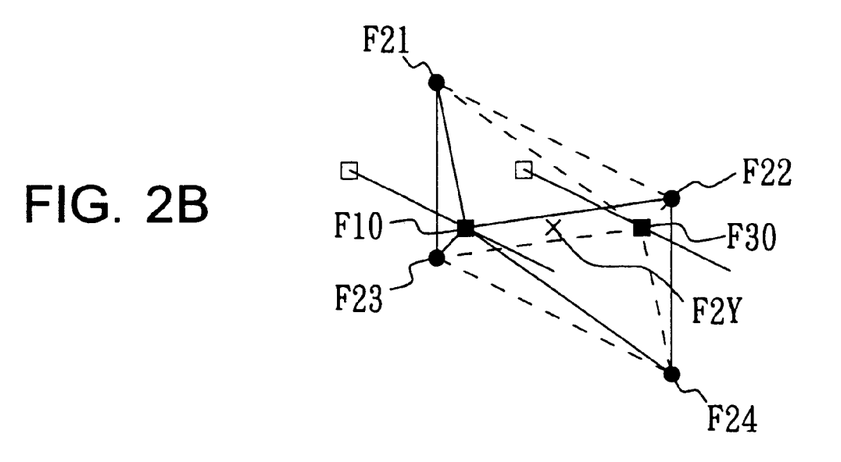

FIG. 2B shows the block for classification of the attentional point F2Y which is neighboring to and lying just under the second frame for the attentional point F2X (FIG. 2A). The blocking circuit for classification 4 collects the single pixel F10, of the first frame, which is lying by the just side of it, the two pixels F21 and F22 which are lying on the slant upper parts as well as the two pixels F23 and F24 which are lying on the slant lower parts on the second frame, and the single pixel F30, of the third frame, which is lying by the just side of it into a block, and then outputs the pixel data of the respective pixels toward the classifying circuit 6, as the blocked pixel data D2.

The blocking circuit for classification 4 executes, hereafter, such blocking process as these (that is, the above-mentioned process with respect to the attentional points F2X and F2Y on the second frame) with respect to the entire screen in like manner.

The classifying circuit 6 exposes each of the blocked pixel data D2 which have been given from the blocking circuit for classification 4 in this manner to, for instance, Adaptive Dynamic Range Coding (ADRC) compression process, and hereby executes the classification which is based on the level distribution pattern with respect to the blocked pixel data D2. The result of the classification is output as the index data INDEX which is the class identification number. As to the ADRC compression process which is used in the classifying circuit 6, if the region of the block is limited to the microscopic space-time shown in FIGS. 2A to 2B, it is utilized that respective pixel data have strong correlation each other. The pixel data is expressed in the dynamic range which is represented by the minimum value and the maximum value of each block, so that the high compression can be realized. It becomes clear that the level distribution pattern of the pixel data of each pixel has the simple inclination by using the above compression method.

Such features can be grasped that, for example, the distribution of brightness has an inclination to become upward convex in the block (that is, it has a peak value in the block), or has an inclination to become downward convex (that is, there is a dark valley in the block), or has an inclination to become plain where it has not any peak or valley of brightness, as the inclination of the level distribution pattern.

On the basis of the level distribution pattern in the block for classification, the classifying circuit 6 allocates a classification code to each pattern, so as to generate the index data INDEX.

The stereoscopic viewing device 1 delivers the television data D1 which has been outputted from the analog-to-digital conversion circuit 5 directly to a delay circuit 7 and also delivers it to the delay circuit 7 via the delay circuit 5. The television data D1 is delayed by means of the delay circuit 7 to the amount of time which has been needed for the classifying process in said classifying circuit 6, and then it is delivered to a predictive blocking circuit 9 of a classification adaptive process part for left eye 8 and to a predictive blocking circuit 11 of a classification adaptive process part for right eye 10.

Figure 3:
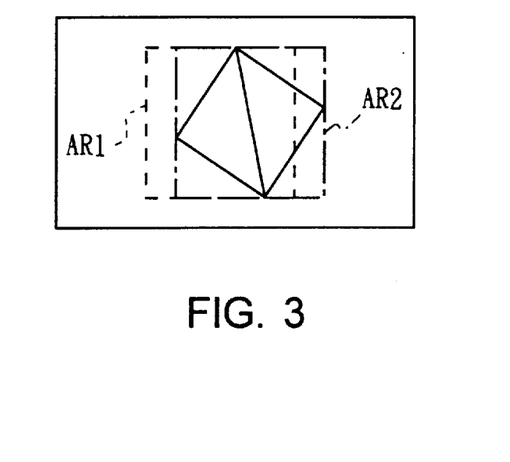
FIG. 3 is a schematic diagram explaining the predictive block which is formed with the predictive blocking circuit.

The predictive blocking circuits 9 and 11 deliver the pixel data of each pixel in the stated spatio-temporal region whose center lies on the attentional point which has been used in the blocking circuit for classification 4 to predictive processing circuits 12 and 13, respectively, as pixel data for predictive calculation D3 and D4. At here, the blocks which are formed by the predictive blocking circuits 9 and 11 are selected to become large regions than the block which is formed by the blocking circuit for classification 4, so that the prediction precision of the pixel data of the attentional point is enhanced hereby. Besides, as shown in FIG. 3, the block region AR1 in the predictive blocking circuit 9 has been arranged to be deviated toward left side to the amount which corresponds to several pixels, with respect to the block region AR2 in the predictive blocking circuit 11. The quantity of the deviation is selected in response to the parallax which is provided between the image for left eye and the image for right eye which are to be generated.

Figure 4:
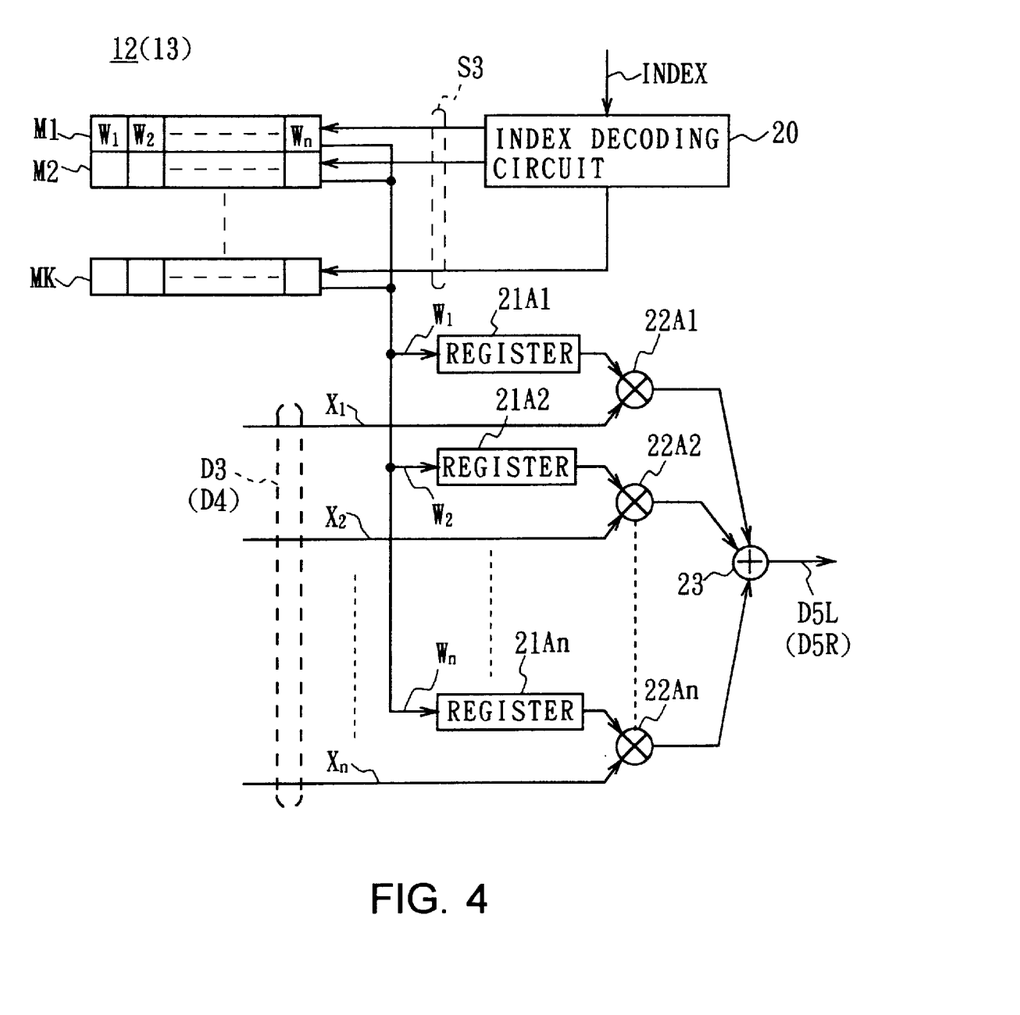
FIG. 4 is a block diagram illustrating a constitution of the predictive processing circuit.

Hereupon, as shown in FIG. 4, the predictive processing circuit 12 (and 13) decodes the index data INDEX which has been given from the classifying circuit 6 in an index decoding circuit 20, so as to generate the coefficient-set memory address signal S3, and hereby accesses one of coefficient-set memories M1, M2, . . . MK which are storing plural sets of coefficients $w_1, w_2, \ldots w_n$ which correspond to the level distribution patterns of the pixel block which is represented by the index data INDEX, and hereby reads the single set of coefficient data $w_1, w_2, \ldots w_n$, into coefficient registers 21A1, 21A2, . . . 21An respectively.

The coefficient data $w_1, w_2, \ldots w_n$ which have been read into the coefficient registers 21A1, 21A2, . . . 21An are multiplied by the data $x_1, x_2, \ldots x_n$ of the pixel data for predictive calculation D3 (and D4) which are delivered from the predictive blocking circuit 9 (and 11) in multipliers 22A1, 22A2, . . . 22An, and the results of the multiplication are added at an adder 23, and then the result of the addition is outputted from the predictive processing circuit 12 (and 13) as the image data for left eye D5L (and the image data for right eye D5R).

In this case, the image data for left eye D5L and the image data for right eye D5R are outputted from the predictive processing circuits 12 and 13 respectively by the pixel clock of 13.5 [MHz], and the size of the images which are respectively based on the image data for left eye D5L and the image data for right eye D5R become about 720 pixels horizontal×480 lines vertical per frame. In this way, the quantity of information of these image data for left eye D5L and image data for right eye D5R is increased to twice the quantity of information of the input television signal S1, so that deterioration of the time resolution and the space resolution can be prevented.

The image data for left eye D5L and the image data for right eye D5R are written into frame memories (FM) 31 and 32 respectively.

The stereoscopic viewing device 1 then supplies the input television signal S1 to a synchronous extraction circuit 33, and the synchronous extraction circuit 33 extracts the vertical synchronous signal V and the horizontal synchronous signal H from the input television signal S1 and sends it toward a timing controller 34.

The timing controller 34 produces a read clock signal S5 on the basis of the inputted vertical synchronous signal V and the horizontal synchronous signal H, and supplies the read clock signal S5 to the frame memories 31 and 32 at the same time.

So, the frame memories 31 and 32 read the image data for left eye D5L and the image data for right eye D5R respectively, in response to the timing of inputting of the read clock signal S5, in a synchronized manner with the television signal S1.

So the image data for left eye D5L and the image data for right eye D5R are converted into the video signal for left eye S2L and the video signal for right eye S2R respectively, by digital-to-analog conversion circuit (D/A) 35 and 36, and then they are supplied to a display device 2.

In this case, the display device 2 is composed by combining two liquid-crystal displays which are corresponding to the left eye and the right eye respectively so that it can be head-mounted, like, for instance, a visortron; therefore, when a man has put the display device 2 on, he is able to enjoy the stereoscopic image.

The coefficient data $w_1, w_2, \ldots w_n$, of every set, which are respectively stored in the coefficient-set memories M1, M2, . . . MK in the predictive processing circuit 12 (and 13), are previously obtained by learning.

Figure 5:
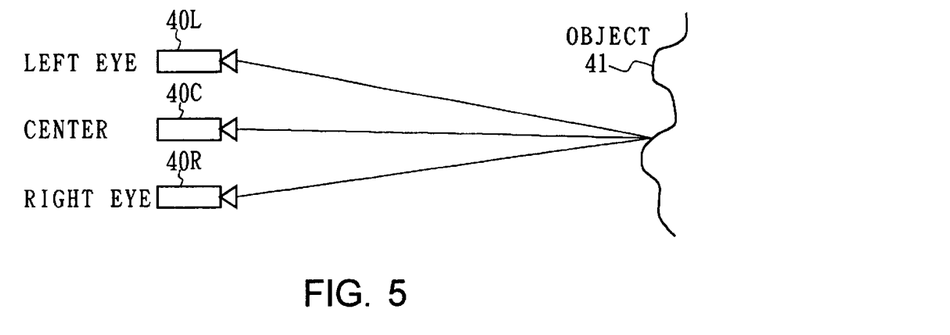
FIG. 5 is a schematic diagram explaining the video signals which are used for the learning.

In this case, as shown in FIG. 5, in this learning, the video signal for left eye, the video signal for right eye, and the central video signal are first utilized which are obtained by simultaneously shooting the standard object 41 by means of the television camera for left eye 40L and the television camera for right eye 40R which have been placed on the positions which are respectively corresponding to the position of left eye and the position of right eye of a man, as well as the central television camera 40C which is corresponding to the ordinary television camera and has been placed between the television camera for left eye 40L and the television camera for right eye 40R.

Figure 6:
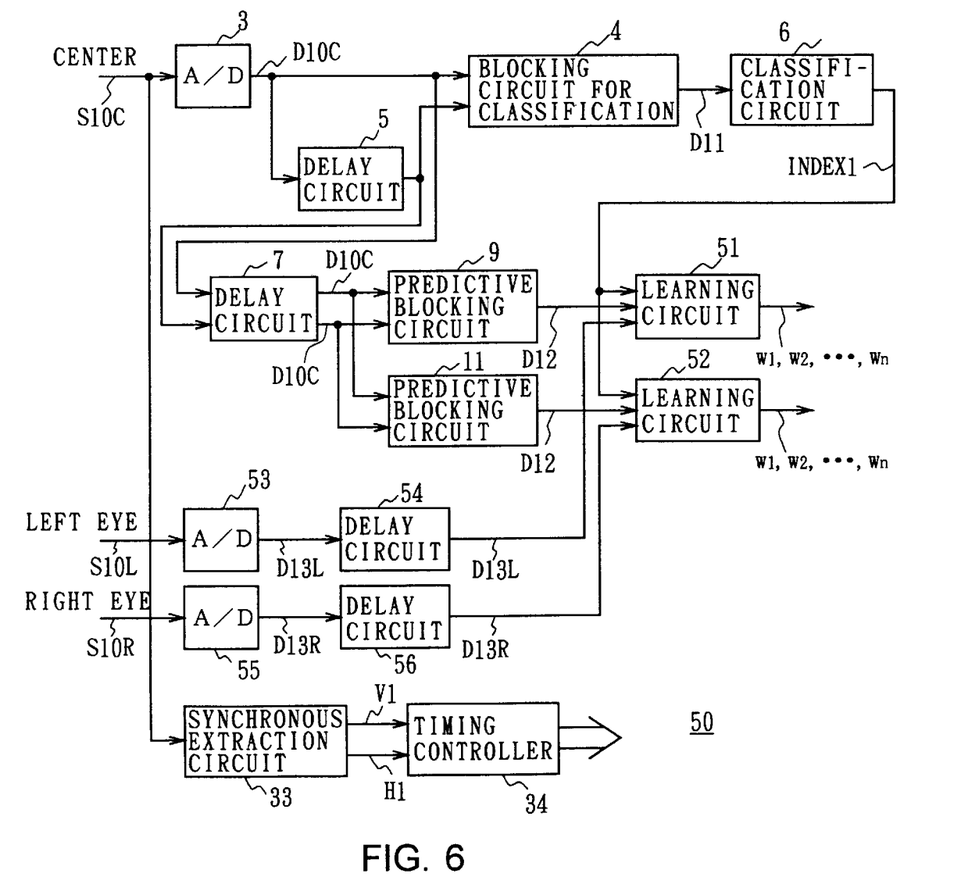
FIG. 6 is a block diagram illustrating a constitution of the coefficient learning circuit.

In fact, the left-eye video signal, the right-eye video signal, and the central video signal which are obtained from the television camera for left eye 40L, the television camera for right eye 40R, and the central television camera 40C are used in a coefficient learning circuit 50, the constitution of which is shown in FIG. 6 which has the same reference numerals as those of FIG. 1 on its portions corresponding to the portions of FIG. 1.

In this case, the coefficient learning circuit 50 converts the central video signal S10C which has been obtained from the central television camera 40C into the central image data D10C at the analog-to-digital conversion circuit 3, with the same clock frequency as the clock frequency of the case of the stereoscopic viewing device 1 (FIG. 1) (in the case of this embodiment, 13.5 [MHz]), and then supplies the central image data D10C to the blocking circuit for classification 4 in the same way as the stereoscopic viewing device 1.

The blocking circuit for classification 4 takes in the pixels which are to be extracted in the same way as the case of the stereoscopic viewing device 1, out of the image data of the central image data D10C, and forms a block with the pixels existing within the spatio-temporal region which is locating its center on the attentional point, in the same way as the blocking operation in the blocking circuit for classification 4, and then supplies the blocked pixel data D11 which is comprised of the pixel data of every pixel existing within the block to the classifying circuit 6.

The classifying circuit 6 executes classifying which is based on the level distribution pattern by performing ADRC compression process against the pixels within the block, and delivers the index data INDEX1 which represents the class code number of the result of the classification to learning circuits 51 and 52.

Besides, the coefficient learning circuit 50 supplies the central image data D10C which has been outputted from the analog-to-digital conversion circuit 3 to the predictive blocking circuit 9 and the predictive blocking circuit 11, in the same way as the stereoscopic viewing device 1. The predictive blocking circuits 9 and 11 supplies the pixel data of each pixel in the stated spatio-temporal region, the center of which exists on the attentional point which have been used at the blocking circuit for classification 4, to the learning circuits 51 and 52 respectively, as the blocked pixel data D12.

In addition, the video signal for left-eye S10L, which has been obtained by means of the television camera for left eye 40L, is converted into the image data for left eye D13L by an analog-to-digital conversion circuit 53, and then supplied to the learning circuit 51 via a delay circuit 54, while the video signal for right-eye S10R, which has been obtained by means of the television camera for right eye 40R, is converted into the image data for right eye D13R by an analog-to-digital conversion circuit 55, and then supplied to the learning circuit 52 via a delay circuit 56.

The learning circuit 51 obtains the coefficient data $w_1$, $w_2$, ... $w_n$, which should be used for multiplying the pixel data which is supplied as the blocked pixel data D12, for each class which is represented by the index data INDEX1, by learning wherein a calculating circuit of the method of least squares is used and the image data for left eye D13L is treated as a teacher data, and thus outputs each set of coefficient data $w_1$, $w_2$, ... $w_n$ for left eye, so that each of these sets is stored in the respective corresponding coefficient-set memory M1, M2, ... MK (FIG. 4).

In like manner, the learning circuit 52 obtains the coefficient data $w_1$, $w_2$, ... $w_n$, which should be used for multiplying the pixel data which is supplied as the blocked pixel data D12, for each class which is represented by the index data INDEX1, by learning wherein a calculating circuit of the method of least squares is used and the image data for right eye D13R is treated as a teacher data, and thus outputs each set of coefficient data $w_1$, $w_2$, ... $w_n$, so that each of these sets is stored in the respective corresponding coefficient-set memory M1, M2, ... MK (FIG. 4).

In this connection, the timing controller 34 generates a control signal for adjusting the timings of blocking of, for instance, the blocking circuit for classification 4 and the predictive blocking circuits 9 and 11 to each other, on the basis of the vertical synchronous signal V1 and the horizontal synchronous signal H1 of the central video signal S10C which has been extracted by the synchronous extraction circuit 33.

At this point, the method to calculate each set of coefficient data $w_1$, $w_2$, ... $w_n$ in the calculating circuit of the method of least squares will be explained. In this case, the calculating circuit of the method of least squares finds the relationship between the plural pixel values (hereinafter, this is referred to as the central pixel values) which are represented with the blocked pixel data D12 and an attentional pixel value (that is, the pixel value for left eye and the pixel value for right eye) which is represented with the image data for left eye D13L (and the image data for right eye D13R), by the use of the method of least squares, in accordance with the following theoretical model.

At first, it is assumed that there is a relationship of linear primary expression combination between the central pixel value $x_{mn}$ (where, m=1, 2, ... m, n=1, 2, ... n) and the pixel value for left eye $\delta y_m$ (m=1, 2, ... m), with the coefficient $w_n$ (n=1, 2, ... n), like the following expression (1):

$$XW = Y \quad (1)$$

however, the following expression (2):

$$X = \begin{bmatrix} x_{11} & x_{12} & \ldots & x_{1n} \\ x_{21} & x_{22} & \ldots & x_{2n} \\ \ldots & \ldots & \ldots & \ldots \\ x_{ml} & x_{m2} & \ldots & x_{mn} \end{bmatrix}, W = \begin{bmatrix} w_1 \\ w_2 \\ \ldots \\ w_n \end{bmatrix}, Y = \begin{bmatrix} \delta y_1 \\ \delta y_2 \\ \ldots \\ \delta y_m \end{bmatrix} \quad (2)$$

In order to solve an observation equation based on such expression (1) with respect to the coefficient $w_i$ (i=1, 2, ... n) which is an unknown, a residual equation like the following expression (3):

$$XW = Y + E \quad (3)$$

is considered; and to find out the coefficient $w_i$ (i=1, 2, ... n) which is the unknown with respect to the residual difference $e_m$ (m=1, 2, ... m) which is represented by the following expression (4):

$$E = \begin{bmatrix} e_1 \\ e_2 \\ \ldots \\ e_m \end{bmatrix} \quad (4)$$

it is required to merely find out the condition wherein the following expression (5):

$$\sum_{i=1}^{m} e_i^2 = e_1^2 + e_2^2 + \ldots + e_m^2 \quad (5)$$

becomes minimum, that is the coefficient $w_i$ (i=1, 2, ... n) which satisfies the following expression (6):

$$e_1 \frac{\delta e_1}{\delta w_i} + e_2 \frac{\delta e_2}{\delta w_i} + \ldots + e_m \frac{\delta e_m}{\delta w_i} = 0 \quad (6)$$

$$(i = 1, 2, \ldots, n)$$

So, partially differentiating the expression (3) by the coefficient $w_i$ (i=1, 2, ... n), which is the unknown, gives the following expression (7):

$$\frac{\delta e_i}{\delta w_1} = x_{i1}, \frac{\delta e_i}{\delta w_2} = x_{i2}, \ldots, \frac{\delta e_i}{\delta w_n} = x_{im} \quad (7)$$

$$(i = 1, 2, \ldots, n)$$

therefore, substituting the expression (7) into the expression (6) and then standing the condition of the expression (6) with respect to i=1, 2, ... n yield the conditional expression of the following expression (8):

$$\sum_{i=1}^{n} e_i x_{i1} = 0, \sum_{i=1}^{n} e_i x_{i2} = 0, \ldots, \sum_{i=1}^{n} e_i x_{im} = 0 \quad (8)$$

Then, the normal equation of the following expression (9):

$$\begin{cases} \left(\sum_{j=1}^{m} x_{j1}x_{j1}\right) w_1 + \left(\sum_{j=1}^{m} x_{j1}x_{j2}\right) w_2 + \ldots + \left(\sum_{j=1}^{m} x_{j1}x_{jn}\right) w_n = \left(\sum_{j=1}^{m} x_{j1}\delta y_j\right) \\ \left(\sum_{j=1}^{m} x_{j2}x_{j1}\right) w_1 + \left(\sum_{j=1}^{m} x_{j2}x_{j2}\right) w_2 + \ldots + \left(\sum_{j=1}^{m} x_{j2}x_{jn}\right) w_n = \left(\sum_{j=1}^{m} x_{j2}\delta y_j\right) \\ \ldots \\ \left(\sum_{j=1}^{m} x_{jn}x_{j1}\right) w_1 + \left(\sum_{j=1}^{m} x_{jn}x_{j2}\right) w_2 + \ldots + \left(\sum_{j=1}^{m} x_{jn}x_{jn}\right) w_n = \left(\sum_{j=1}^{m} x_{jn}\delta y_j\right) \end{cases} \quad (9)$$

is obtained by the expression (3) and the expression (8).

At here, because the expression (9) is simultaneous equations which have "n" unknowns, the coefficient $w_i$ (i=1, 2, ... n) which is the most probable value can be obtained from this simultaneous equations; speaking of it correctly, if the matrix which is multiplied by the unknown $w_i$ in the expression (9), that is the following expression (10):

$$\left(\sum_{j=1}^{m} x_{jk}x_{jl}\right) \quad (10)$$

however, $(k = 1, 2, \ldots, n \quad l = 1, 2, \ldots, n)$ is regular, it is able to solve the coefficient $w_i$ as an unknown. In fact, the simultaneous equations are solved using the method of elimination (sweeping-out method) of Gauss-Jordan.

Figure 7:
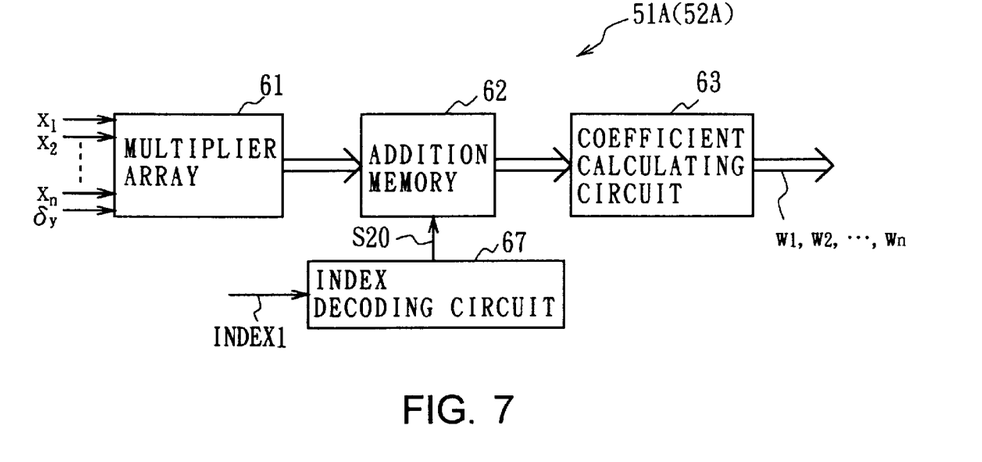
FIG. 7 is a block diagram illustrating a constitution of the calculating circuit for the method of least squares.

At here, as shown in FIG. 7, on the basis of such theoretical model, the calculating circuit of the method of least squares 51A (and 52A) of the learning circuit 51 (and 52) has a multiplier array 61 for executing multiplication of the terms of $x_{jn}x_{jn}$(j=1, 2, ... n, n=1, 2, ... n) and $x_{jn}$ $\delta y_j$ (j=1, 2, ... n, n=1, 2, ... n) out of the expression (9); the result of such calculation, that is the result of the multiplication of $x_{jn}x_{jn}$ (j=1, 2, ... n, n=1, 2, ... n) and $x_{jn}$ $\delta y_j$ (j=1, 2, ... n, n=1, 2, ... n), is supplied to an addition memory 62. Each term of the simultaneous equations which are represented by the expression (9) is recorded in the addition memory 62; the coefficient $w_i$ (i=1, 2, ... n) is obtained by solving the simultaneous equations which have been delivered from the addition memory 62 using the method of elimination (sweeping-out method) of Gauss-Jordan in the following coefficient calculating circuit 63, in this way the coefficient data $w_1$, $w_2$, ... $w_n$ are sent out from the coefficient calculating circuit 63.

Figure 8:
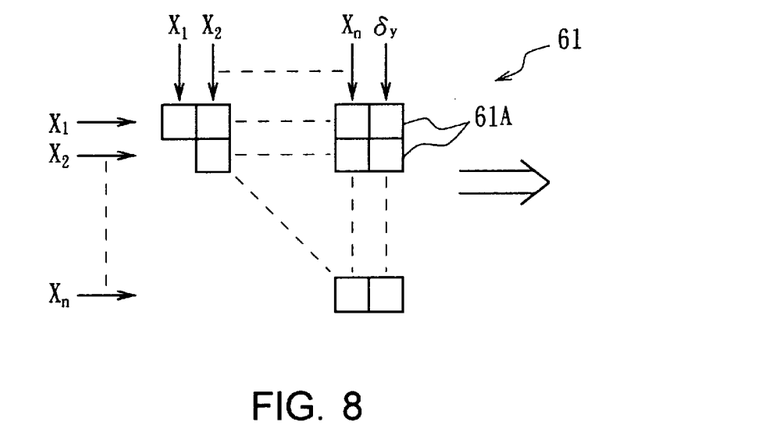
FIG. 8 is a schematic diagram illustrating a constitution of the multiplier array.
Figure 9:
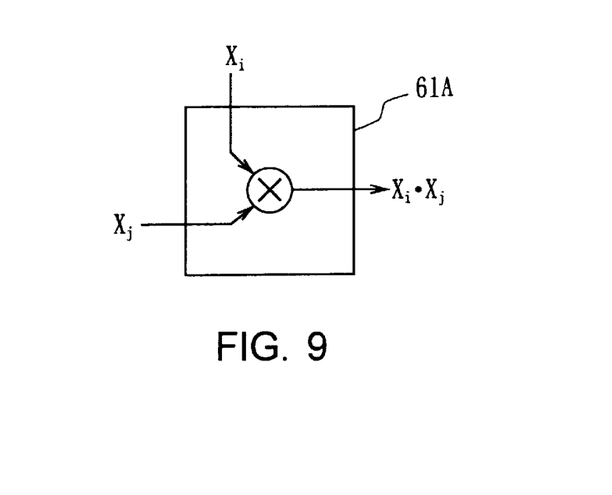
FIG. 9 is a diagram illustrating a detail constitution of the multiplier array of FIG. 8.

In this case, as shown in FIG. 8, the multiplier array 61 of calculating of the method of least squares 51A (and 52A) is corresponding to the term of the slant right half portion out of the term $x_{jn}x_{jn}$ (j=1, 2, ... n, n=1, 2, ... n) of the expression (9), and provided with only the multiplier 61A of the constitution shown in FIG. 9 respectively, so that the constitution is simplified. In this connection, if the upper right term is inverted in the normal equation of the expression (9), it becomes the same as the lower left term, therefore, the multiplier 61A may be provided with only that which corresponds to the upper right term.

Figure 10:
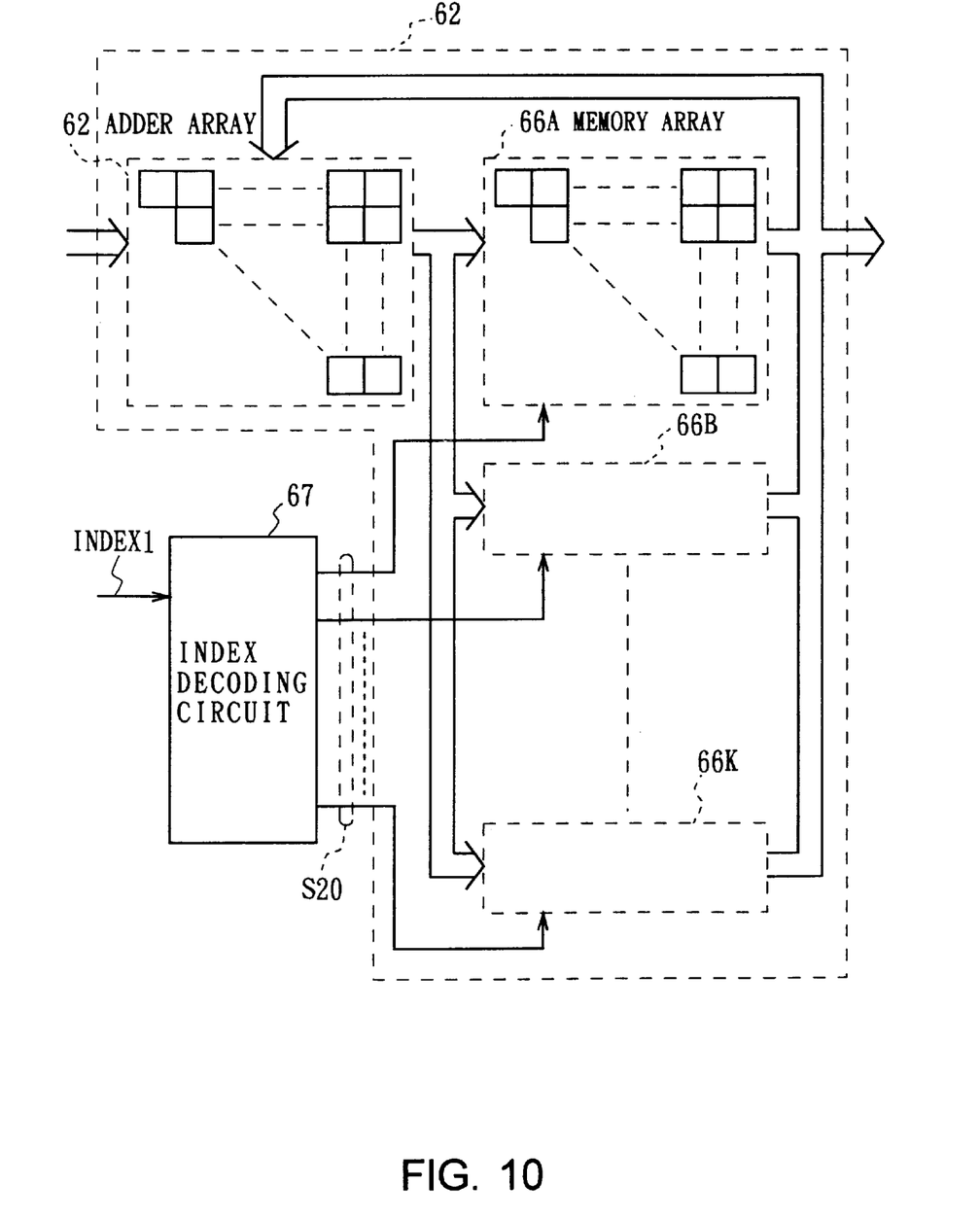
FIG. 10 is a schematic diagram illustrating a constitution of the adder memory.

Besides, as shown in FIG. 10, the addition memory 62 is comprised of an adder array 65 and memory (or register) arrays 66A, 66B, ... 66K which have been provided by the number of the classes. Speaking of the memory arrays 66A, 66B, ... 66K, when the index data INDEX1 which is supplied from the classifying circuit 6 (FIG. 6) have been given to it, one memory array 66A, 66B, ... or 66K is specified in response to an address signal S20 which is obtained by decoding of the index data INDEX1 at an index decoding circuit 67, and then the stored value of the specified memory array 66A, 66B, ... or 66K is fed back to the adder array 62. The result of addition which is obtained with the adder array 62 at this time is again stored in the corresponding memory 66A, 66B, ... or 66K.

When the classified class has been specified by the index data INDEX1, the normal equation based on the expression (9) is read from the memory area which is corresponding to it, and the coefficient $w_i$ (i=1, 2, ... n) is found by calculation at the coefficient calculating circuit 63, so that the coefficient data $w_1$, $w_2$, ... $w_n$ is sent out from the coefficient calculating circuit 63 and stored in the coefficient-set memory M1, M2, ... MK which is comprised of a ROM of the predictive processing circuit 12 (and 13, FIG. 1).

In the above constitution, when the input television signal S1 which is comprised of a broadcasting signal and such has been inputted, the stereoscopic viewing device 1 classifies the inputted television signal S1 for every attentional point, and performs predictive calculation of the pixel data for predictive calculation D3 and D4, which are respectively based on the television signal S1, by the use of the predictive coefficient data for right eye $w_1$, $w_2$ ... $w_n$ and the predictive coefficient data for left eye $w_1$, $w_2$ ... $w_n$ which are corresponding to the result of the classification, so as to generate the image data for left eye D5L and the image data for right eye D5R. As a result, it is able to generate the image data for left eye D5L and the image data for right eye D5R without a deterioration of time resolution, even though the quantity of information is not increased with respect to the transmission or the recording.

Besides, this stereoscopic viewing device 1 causes the display device 2 to display the image data for left eye D5L and the image data for right eye D5R in a synchronized manner with the input television signal S1. So that, a viewer is able to enjoy the satisfactory stereoscopic vision without flicker, on the display device 2.

According to the above constitution, the classifying circuit 6 first classifies the input television signal S1 in response to the level distribution pattern, which is formed by the pixel in the spatio-temporal region whose center is lying on each attentional point, and generates the index data INDEX based on the result of the classification. Also, the predictive blocking circuits 9 and 11 generate the image data for predictive calculation D3 and D4 by blocking the input television signal S1 for every pixel in the stated spatio-temporal region whose center is lying on each abovementioned attentional point. The predictive processing circuits 12 and 13 are previously having the respective predictive coefficient sets which are corresponding to the respective classes, and which respectively process the predictive calculation of the predictive calculating pixel data D3 and D4, using the predictive coefficient which is corresponding to the index data INDEX, out of the predictive coefficients of these respective sets, and hereby generate the image data for left eye D5L and the image data for right eye D5R. then, the display device 2 for projecting the stereoscopic image on the basis of the image data for left eye D5L and the image data for right eye D5R is provided, so that a stereoscopic image can be projected on the display device 2 such that a flicker is eliminated and a deterioration of the image quality is prevented. Further, a satisfactory stereoscopic viewing image can be obtained without increasing of the quantity of recorded information or the quantity of transmitted information.

(2) Other Embodiments

In the description of the above embodiment, the ADRC has been utilized, as the method of classifying each pixel which is lying in the spatio-temporal region whose center is located on the attentional point, on the basis of the level distribution pattern. However, the present invention is not limited to this, but it is able to utilize the various methods of compression, such as Discrete Cosine Transform (DCT), Difference Quantization (DPCM), and BTC (Block Truncation Coding).

Besides, in the description of the above embodiment, a ROM has been used as the memory means for storing the predictive coefficient. However, a RAM (Random Access Memory) or a SRAM can be used alternatively.

In addition, in the above embodiment, the description has been given of the case where the converting operation on the analog-to-digital conversion circuit 3, 53 and 55 is executed with the sampling frequency of 13.5 [MHz]. However, the present invention is not limited to this, but the clock frequency may be altered to, for instance, 14.3 [MHz] as necessary.

Moreover, in the above embodiment, the description has been given of the case where the classification adaptive processes on the classification adaptive process circuits for left eye and for right eye 8 and 10 are realized by the hardware structure. However, the present invention is not limited to this, but it can be realized with a software such that the digitized data is taken in the computer.

Furthermore, in the above embodiment, the description has been given of the case where the stereoscopic image is displayed on the display device 2 on the basis of the left-eye video signal S2L and the right-eye video signal S2R which have been generated from the input television signal S1. However, the present invention is not limited to this, but the same effects as the above can be also obtained in the case where the left-eye video signal S2L and the right-eye video signal S2R, which have been generated from the input television signal S1, are once recorded in the recording device, and subsequently reproduced from the recording device so that it is supplied to the display device 2.

Figure 11A:
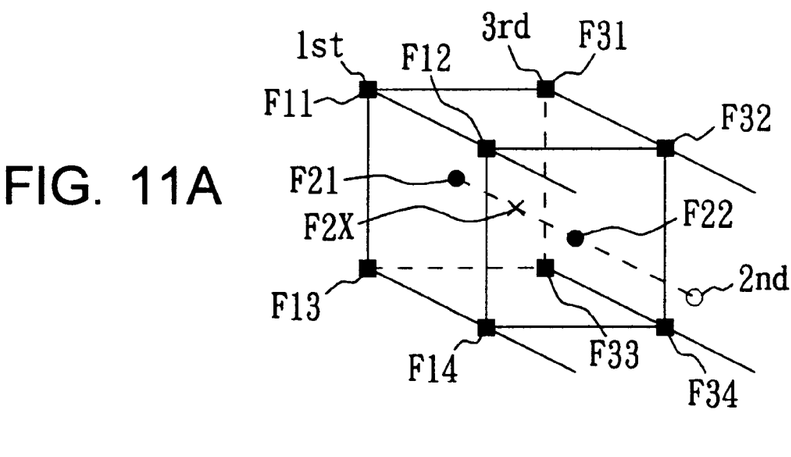
FIG. 11 is a schematic diagram explaining the blocking for classification according to the other embodiment.
Figure 11B:
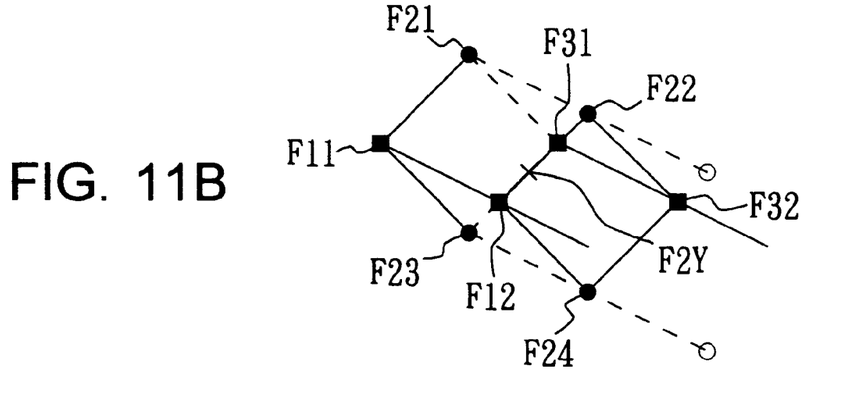

Moreover, in the above embodiment, the description has been given of the case where the blocking for classification of the television data D is performed on the blocking circuit for classification 4 with respect to the diamond-shaped micro-region, as shown in FIGS. 2A and 2B. However, the present invention is not limited to this, but the blocking for classification can be performed with respect to the square micro-region, as shown in FIGS. 11A and 11B.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A stereoscopic image generating device for generating a stereoscopic image based on an input video signal, said device comprising:

classifying means for respectively classifying said input video signal into index classes on the basis of a level distribution pattern of plural pixels in a first predetermined spatio-temporal region;

left eye predictive coefficient storing means for storing plural sets of predictive coefficients for left eye images which correspond to the respective index classes and which have been previously obtained by learning;

right eye predictive coefficient storing means for storing plural sets of predictive coefficients for right eye images which correspond to the respective index classes and which have been previously obtained by learning;

predictive blocking means for blocking said input video signal for every plural pixels in a second predetermined spatio-temporal region, and for generating predictive block values for predictive calculating;

left eye calculating means for generating a left eye video signal by performing a calculation on the basis of a linear primary combination expression; which uses said input video signals, said sets of left eye predictive coefficients obtained from said left eye predictive coefficient storing means in response to the classification results obtained on the basis of the output of said classifying means, and also uses said predictive block values obtained on the basis of the output of said predictive blocking means; and right eye calculating means for generating a right eve video signal by performing a calculation on the basis of a linear primary combination expression; which uses said input video signals, said sets of right eve predictive coefficients obtained from said right eye predictive coefficient storing means in response to the classification results obtained on the basis of the output of said classifying means, and also uses said predictive block values obtained on the basis of the output of said predictive blocking means.

2. The stereoscopic image generating device according to claim 1, further comprising means for obtaining said predictive coefficients including:

a central image inputting unit for inputting a central learning video signal, a left eye image inputting unit for inputting a left eye learning video signal, and a right eye image inputting unit for inputting a right eye learning video signal, said image inputting units being located at positions having parallax, said input learning video signals being classified into index classes by said classifying means on the basis of said level distribution pattern of plural pixels in said first predetermined spatio-temporal regions; and said central learning video signals being paired respectively with said left eve learning video signals and said right eye learning video signals having the same said index classes to form sets of linear primary combination expressions, solvable using the method of least squares, to determine said sets of left eye predictive coefficients and right eye predictive coefficients for left and right eye images respectively, each said set of predictive coefficients corresponding to a said index class.

3. The stereoscopic image generating device according to claim 1, wherein the generated stereoscopic image is displayed on a liquid crystal display of head-mount type for respectively displaying said left eye video signal and said right eye video signal.

4. A stereoscopic image generating method for generating a stereoscopic image based on an input video signal, said method comprising the steps of:
classifying said input video signal into index classes on the basis of a level distribution pattern of plural pixels in a first predetermined spatio-temporal region;
storing plural sets of previously learned left eye predictive coefficients for left eye images which correspond to the respective index classes;
storing plural sets of previously learned right eye predictive coefficients for right eye images which correspond to the respective index classes;
blocking said input video signal for every plural pixels in a second predetermined spatio-temporal region to produce predictive block values for predictive calculating;
generating a left eye video signal by performing a calculation on the basis of a linear primary combination expression, which uses said input video signals said stored sets of left eye predictive coefficients and said predictive block values; and
generating a right eye video signal by performing a calculation on the basis of a linear primary combination expression, which uses said input video signals, said stored sets of right eye predictive coefficients and said predictive block values.

5. The stereoscopic image generating method according to claim 4, wherein said predictive coefficients are obtained by:
inputting a central learning video signal, inputting a left eye learning video signal, and inputting a right eye learning video signal from respective positions having parallax, said learning video signals being classified by said classifying means on the basis of said level distribution pattern of plural pixels in said first predetermined spatio-temporal region; and
pairing respectively said central learning video signals with said left eye learning video signals and said right eye learning video signals having the same said index classes to form sets of linear primary combination expressions, solvable using the method of least squares, to determine said sets of left eye predictive coefficients and right eye predictive coefficients for left and right eye images respectively.

6. The stereoscopic image generating method according to claim 4, wherein the generated stereoscopic image is displayed on a liquid crystal display of head-mount type for respectively displaying said left eye video signal and said right eye video signal.

7. A stereoscopic image generating device for generating a stereoscopic image based on multi-pixel processing of images from an input video signal, said device comprising:
a classification blocking circuit for time delaying and spatial grouping pixels in a region surrounding each image pixel of said input video signal into a spatio-temporal classification block;
a classification circuit for calculating respective index values on the basis of a level distribution pattern for each said spatio-temporal classification block;
a predictive blocking circuit for time delaying and spatial grouping pixels in a region surrounding each image pixel of said input video signal into respective spatio-temporal predictive blocks; and
a predictive processing circuit for selecting a predictive coefficient set from plural predetermined sets of predictive coefficients on the basis of said index values, and for performing a predictive calculation upon a single image from said input video signal to create new images with simulated parallax, said predictive calculation selectively modifying individual pixels using said selected predictive coefficient set and said spatio-temporal predictive blocks to generate a left eye video signal and a right eye video signal from said single image.

8. The stereoscopic image generating device according to claim 7, further comprising:
a left eye predictive coefficient store for storing plural predetermined sets of left eye predictive coefficients corresponding to respective index values; and
a right eye predictive coefficient store for storing plural predetermined sets of right eye predictive coefficients corresponding to respective index values.

9. The stereoscopic image generating device according to claim 8, wherein said predictive blocking circuit comprises:
a left eye predictive blocking circuit for time delaying and spatial grouping pixels in a region surrounding each image pixel of said input video signal into respective left eye spatio-temporal predictive blocks; and
a right eye predictive blocking circuit for time delaying and spatial grouping pixels in a region surrounding each image pixel of said input video signal into respective right eye spatio-temporal predictive blocks.

10. The stereoscopic image generating device according to claim 9, wherein said predictive processing circuit comprises:
a left eye processor for performing a sequence of predictive calculations upon single images from said input video signal to create new images with simulated parallax; said predictive calculations selectively modifying individual pixels using said left eye spatio-temporal predictive blocks and said stored sets of left eye predictive coefficients, selected from said left eye predictive coefficient store on the basis of respective index values output from said classification circuit, to generate left eye images which are sequentially output as said left eye video signal; and
a right eye processor for performing a sequence of predictive calculations upon single images from said input video signal to create new images with simulated parallax;
said predictive calculations selectively modifying individual pixels using said right eye spatio-temporal predictive blocks and said stored sets of right eye predictive coefficients, selected from said right eye predictive coefficient store on the basis of respective index values output from said classification circuit, to generate right eye images which are sequentially output as said right eye video signal.

11. The stereoscopic image generating device according to claim 10, further comprising learning means for generating said sets of left eye and right eye predictive coefficients, including:
a central image camera for inputting a central learning video signal, a left eye image camera for inputting a left eye learning video signal, and a right eye image camera for inputting a right eye learning video signal, said cameras being located at known distances from each other thereby producing a known parallax between their respective images; said central learning video signal being processed by said classification blocking circuit and said classification circuit into said index values; and said central learning video signal being processed by said left eye and right eye predictive blocking circuits into said left eye and right eye spatio-temporal predictive blocks respectively;

pairing means for pairing central learning video images with corresponding left eye learning video images and right eye learning video images respectively;

calculating means for forming a pair of transformation matrix expressions for each pair of images; the expression corresponding to said left eye learning image formed by multiplying said left eye spatio-temporal predictive blocks, processed from said central learning image, by a set of unknown coefficients and setting the result equal to the paired left eye learning image; the expression corresponding to said right eye learning image formed by multiplying said right eye spatio-temporal predictive blocks, processed from said central learning image, by a set of unknown coefficients and setting the result equal to the paired right eye learning image;

solving means for solving said pair of transformation matrix expressions for said unknown coefficients using the method of least squares;

grouping means for grouping the solved coefficients on the basis of the index values from said central learning image, thereby forming sets of left eye and right eye predictive coefficients, depending on the paired image, and corresponding to one of said index values; and storing means for storing said sets of left eye and right eye predictive coefficients in said left eye and right eye predictive coefficient stores, respectively.

12. The stereoscopic image generating device according to claim 11, wherein said stereoscopic image is displayed on a liquid crystal display of head-mount type for respectively displaying said left eye video signal and said right eye video signal.

13. A learning device for learning predictive coefficients for right eye images and left eye images used in a stereoscopic image generating device, said learning device comprising:

classifying means for respectively classifying a first input video signal obtained by a center image camera into index classes on the basis of a level distribution pattern of plural pixels in a first predetermined spatio-temporal region;

first predictive blocking means for blocking said first input video signal for every plural pixels in a second predetermined spatio-temporal region, and for generating first predictive block values, second predictive blocking means for blocking said first input video signal for every plural pixels in a third predetermined spatio-temporal region, and for generating second predictive block values;

first learning means supplied with a second input video signal obtained by a right side image camera and said first predictive block values for learning predictive coefficients for right eye images; and second learning means supplied with a third input video signal obtained by a left side image camera and said second predictive block values for learning predictive coefficients for left eye images.

14. A learning method for learning predictive coefficients for right eye images and left eye images used in a stereoscopic image generating device, said learning method comprised of:

classifying a first input video signal obtained by a center image camera into index classes on the basis of a level distribution pattern of plural pixels in a first predetermined spatio-temporal region;

blocking step for blocking said first input video signal for every plural pixels in a second predetermined spatio-temporal region to generate first predictive block values;

blocking said first input video signal for every plural pixels in a third predetermined spatio-temporal region to generate second predictive block values;

learning predictive coefficients for right eye images from a second input video signal obtained by a right side image camera and said first predictive block values; and learning predictive coefficients for left eye images from a third input video signal obtained by a left side image camera and said second predictive block values.

15. The learning method according to claim 14, further comprised of:

grouping said predictive coefficients for left eye images into sets of left eye predictive coefficients on the basis of said index classes output from said classifying step;

grouping said predictive coefficients for right eye images into sets of right eye predictive coefficients on the basis of said index classes output from said classifying step;

storing said sets of left eye predictive coefficients in a left eye predictive coefficient store; and storing said sets of right eye predictive coefficients in a right eye predictive coefficient store.

16. The learning device according to claim 13, further comprising:

grouping means for grouping said predictive coefficients for left eye images into sets of left eye predictive coefficients on the basis of said index classes output from said classifying means;

grouping means for grouping said predictive coefficients for right eye images into sets of right eye predictive coefficients on the basis of said index classes output from said classifying means;

storing means for storing said sets of left eye predictive coefficients in a left eye predictive coefficient store; and storing means for storing said sets of right eye predictive coefficients in a right eye predictive coefficient store.

* * * * *